United States Patent
Nakabayashi et al.

(10) Patent No.: US 12,104,937 B2
(45) Date of Patent: Oct. 1, 2024

(54) ULTRASONIC FLOWMETER

(71) Applicant: Panasonic Intellectual Property Management Co., Ltd., Osaka (JP)

(72) Inventors: Yuuji Nakabayashi, Nara (JP); Masato Satou, Nara (JP); Asako Miyoshi, Kyoto (JP); Masataka Matsuda, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 573 days.

(21) Appl. No.: 17/425,931

(22) PCT Filed: Mar. 13, 2020

(86) PCT No.: PCT/JP2020/011115
§ 371 (c)(1),
(2) Date: Jul. 26, 2021

(87) PCT Pub. No.: WO2020/203183
PCT Pub. Date: Oct. 8, 2020

(65) Prior Publication Data
US 2022/0170770 A1  Jun. 2, 2022

(30) Foreign Application Priority Data
Mar. 29, 2019  (JP) ................. 2019-065595

(51) Int. Cl.
*G01F 1/66* (2022.01)
*G01F 1/667* (2022.01)
(Continued)

(52) U.S. Cl.
CPC .............. *G01F 1/662* (2013.01); *G01F 1/667* (2013.01); *G01K 13/02* (2013.01); *G01F 15/02* (2013.01)

(58) Field of Classification Search
None
See application file for complete search history.

(56) References Cited

U.S. PATENT DOCUMENTS

| | | | |
|---|---|---|---|
| 2006/0185443 A1* | 8/2006 | Fujimoto | G01N 29/07 73/861.28 |
| 2015/0082913 A1 | 3/2015 | Maruyama et al. | |

(Continued)

FOREIGN PATENT DOCUMENTS

| | | |
|---|---|---|
| EP | 2 749 855 | 7/2014 |
| JP | 8-240460 | 9/1996 |

(Continued)

OTHER PUBLICATIONS

International Search Report of PCT application No. PCT/JP2020/011115 dated Jun. 16, 2020.
(Continued)

*Primary Examiner* — Erica S Lin
(74) *Attorney, Agent, or Firm* — Wenderoth, Lind & Ponack, L.L.P.

(57) ABSTRACT

An ultrasonic flowmeter includes: a flow path body having a flow path through which a fluid to be measured flows; a pair of ultrasonic transducers disposed in the flow path body; a substrate fixed to the flow path body; a sensor plate on which a temperature sensor for detecting a temperature of the fluid to be measured is disposed, the sensor plate being flat; and an arithmetic unit that calculates a flow rate of the fluid to be measured from a propagation time of ultrasonic waves between the pair of ultrasonic transducers and the temperature detected by the temperature sensor. The sensor plate is configured to project from the substrate and to project into a flow path cross-section of the flow path from a sensor hole provided in the flow path body at a time of fixing the substrate to the flow path body.

9 Claims, 7 Drawing Sheets

(51) Int. Cl.
 *G01K 13/02* (2021.01)
 *G01F 15/02* (2006.01)

(56) References Cited

U.S. PATENT DOCUMENTS

2015/0198471 A1* 7/2015 Furlong .................. G01F 1/662
 73/861.27
2020/0179629 A1 6/2020 Burgess et al.

FOREIGN PATENT DOCUMENTS

| | | |
|---|---|---|
| JP | 2000-046608 | 2/2000 |
| JP | 2004-526127 | 8/2004 |
| JP | 2012-242298 | 12/2012 |
| JP | 2019-502435 | 1/2019 |
| WO | 2002/025222 | 3/2002 |
| WO | 2017/095241 | 6/2017 |

OTHER PUBLICATIONS

Extended European Search Report issued Apr. 14, 2022 in corresponding European Patent Application No. 20783573.7.

* cited by examiner

ULTRASONIC FLOWMETER

CROSS-REFERENCE TO RELATED APPLICATIONS

This application is a U.S. national stage application of the PCT International Application No. PCT/JP2020/011115 filed on Mar. 13, 2020, which claims the benefit of foreign priority of Japanese patent application No. 2019-065595 filed on Mar. 29, 2019, the contents all of which are incorporated herein by reference.

TECHNICAL FIELD

The present disclosure relates to an ultrasonic flowmeter that propagates ultrasonic waves to a fluid flowing in a measurement flow path to measure the flow velocity of the fluid and adds the temperature measurement of the fluid to enhance measurement accuracy.

BACKGROUND ART

Conventionally, as an ultrasonic flowmeter that measures a flow rate by ultrasonic waves and also measures a temperature of a fluid, there is known an ultrasonic flowmeter that inserts a cylindrical thermistor into a flow path to measure a temperature (e.g., see Patent Literature (PTL) 1).

Figure 9:
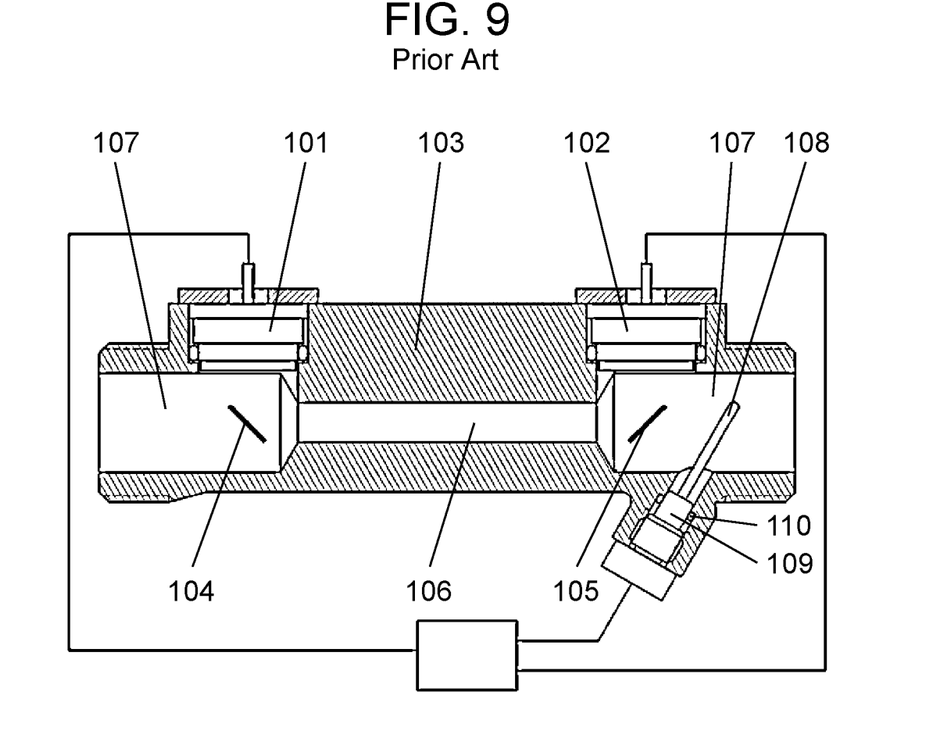
FIG. 9 is a cross-sectional view illustrating a configuration of a flow path in a conventional ultrasonic flowmeter.

FIG. 9 illustrates a cross-section of an ultrasonic flowmeter described in PTL 1.

In this flowmeter, a pair of ultrasonic transducers 101, 102 is disposed in flow path body 103, deflection mirrors 104, 105 for reflecting ultrasonic waves to respective ultrasonic transducers 101, 102 are provided, and ultrasonic waves are propagated to measurement flow path 106 to measure a flow velocity and a flow rate. Further, cylindrical thermistor 108 is inserted from the wall surface of flow path body 103 so as to be positioned at the flow center on the downstream side of flow path 107, and mount 109 of thermistor 108 is hermetically sealed with O-ring 110 or the like to measure the temperature of the fluid.

CITATION LIST

Patent Literature

PTL 1: Unexamined Japanese Patent Publication (Translation of PCT Application) No. 2004-526127

SUMMARY OF THE INVENTION

However, in the conventional configuration, the cylindrical portion of thermistor 108 is formed of a metal pipe or the like, and a temperature detector is disposed at its tip, whereby the temperature of the outer wall surface of flow path body 103 has an influence due to the heat transfer action of the metallic cylindrical portion. In particular, when the difference between the ambient temperature on the outer wall surface of flow path body 103 and the fluid temperature is large, an error occurs in temperature measurement, which has been problematic.

Further, as in the conventional configuration illustrated in FIG. 9, by reducing the diameter of the cylindrical portion, the influence from the wall surface can be reduced when the heat transfer from the fluid is high, such as when the flow velocity is high, but when the heat transfer is not large, such as when the fluid to be measured is a gas or when the flow velocity is low, there is a possibility that a temperature measurement error may occur due to the influence of the wall surface temperature of flow path body 103.

The present disclosure provides an ultrasonic flowmeter that significantly reduces the influence of ambient temperature to measure fluid temperature with high accuracy and enhances the accuracy of flow rate measurement.

An ultrasonic flowmeter of the present disclosure includes: a flow path body having a flow path through which a fluid to be measured flows; a pair of ultrasonic transducers disposed in the flow path body; a substrate fixed to the flow path body; and a sensor plate on which a temperature sensor for detecting a temperature of the fluid to be measured is disposed, the sensor plate being flat. The ultrasonic flowmeter also includes an arithmetic unit that calculates a flow rate of the fluid to be measured from a propagation time of ultrasonic waves between the pair of ultrasonic transducers and the temperature detected by the temperature sensor. The sensor plate is configured to project from the substrate and to project into a flow path cross-section of the flow path from a sensor hole provided in the flow path body at a time of fixing the substrate to the flow path body. With this configuration, it is possible to achieve an ultrasonic flowmeter that can significantly reduce the influence of the ambient temperature of the flow path to measure the fluid temperature with high accuracy and has high measurement accuracy.

The ultrasonic flowmeter of the present disclosure includes a flat sensor plate provided with a temperature sensor projected and fixed to the substrate, and the sensor plate has the temperature sensor disposed to project in a flow cross-section along the flow direction of the flow path, whereby it is possible to achieve a flowmeter that can significantly reduce the influence of the ambient temperature of the flow path to measure the fluid temperature with high accuracy and has high versatility and high measurement accuracy.

DESCRIPTION OF EMBODIMENTS

Exemplary embodiments will be described below with reference to the drawings. The present disclosure is not limited by the exemplary embodiments.

First Exemplary Embodiment

A first exemplary embodiment will be described with reference to FIGS. 1 to 4.

Figure 1:
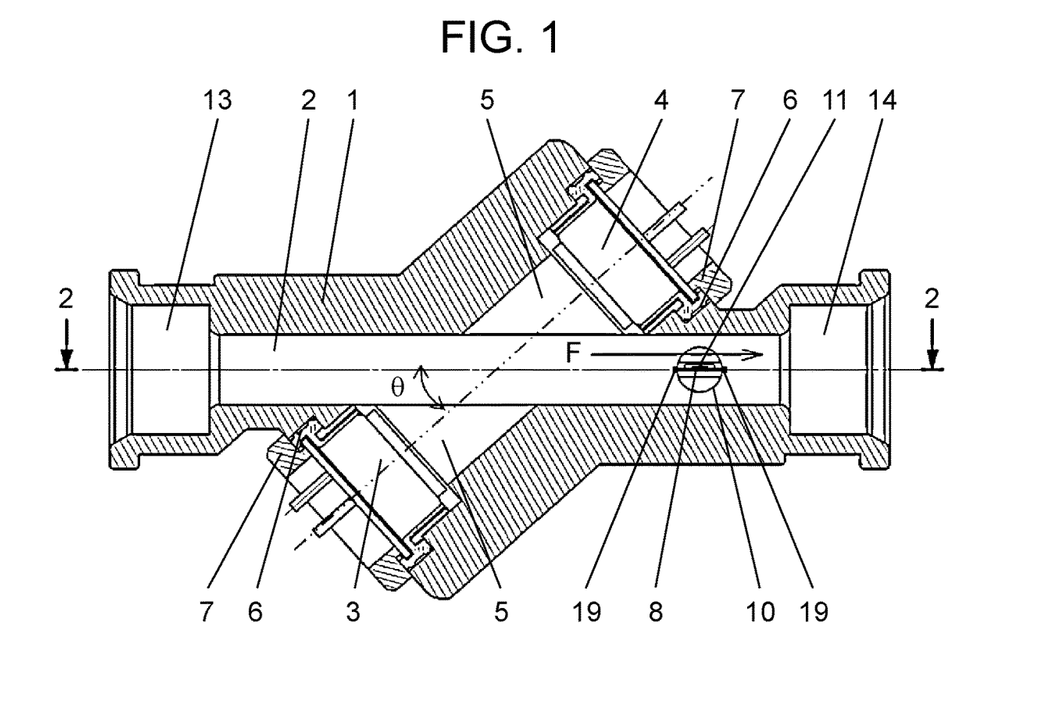
FIG. 1 is a transverse cross-sectional view of an ultrasonic flowmeter according to a first exemplary embodiment.
Figure 2:
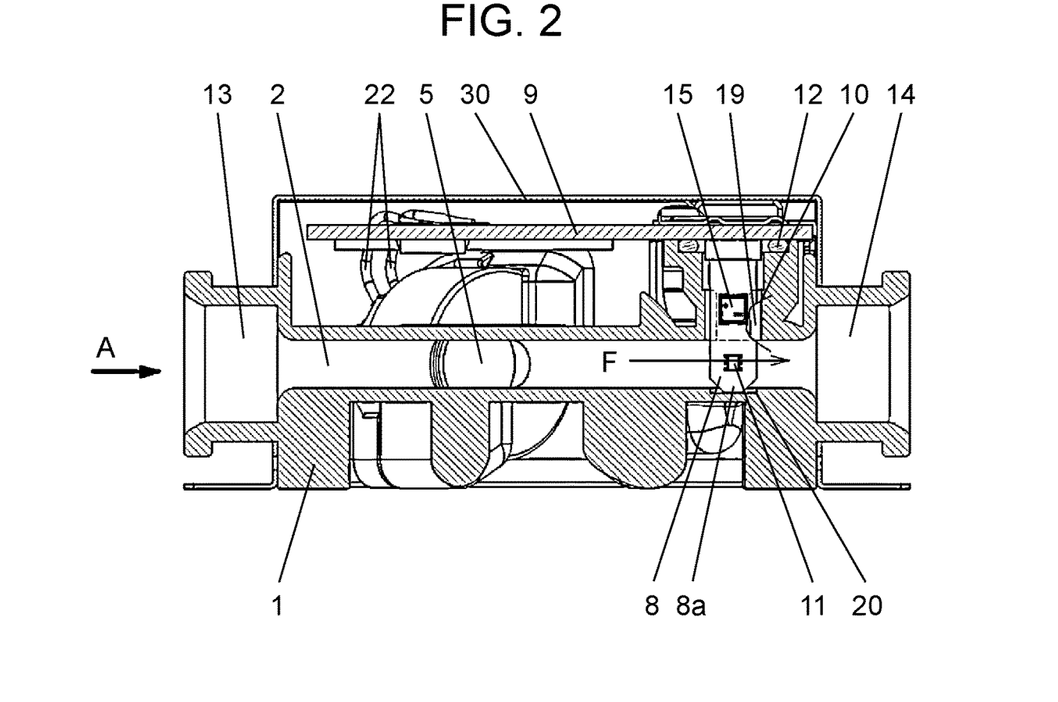
FIG. 2 is a cross-sectional view taken along line 2-2 in FIG. 1.
Figure 3:
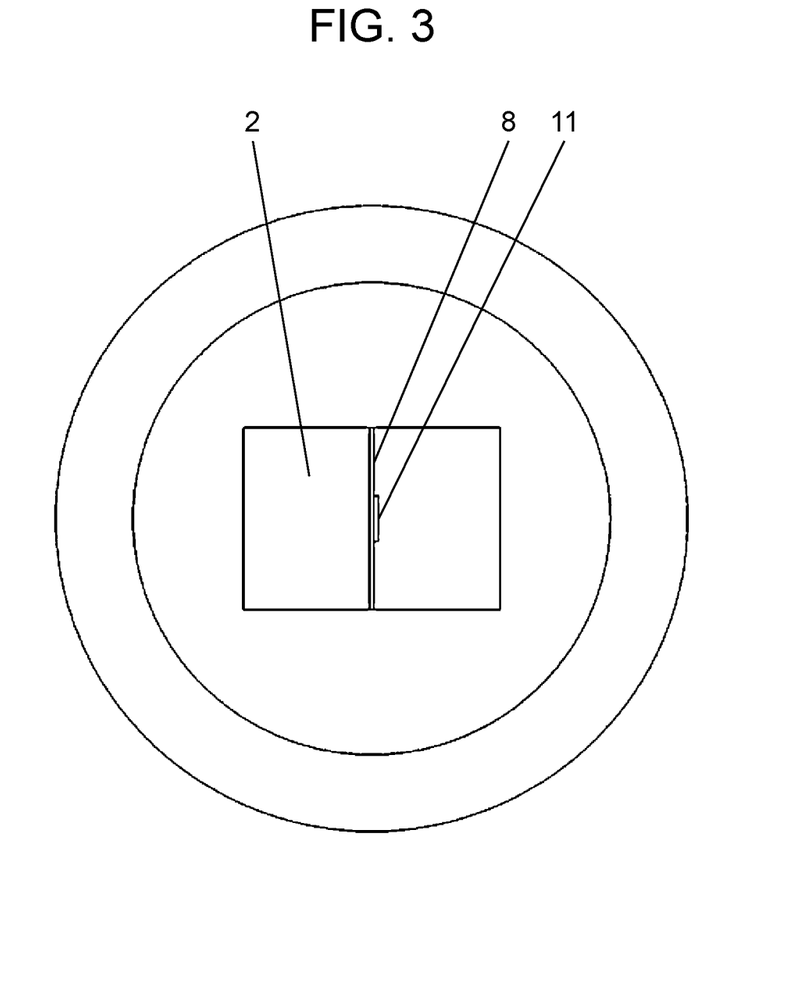
FIG. 3 is a view on arrow A of FIG. 2 illustrating a sensor plate of the ultrasonic flowmeter according to the first exemplary embodiment.
Figure 4:
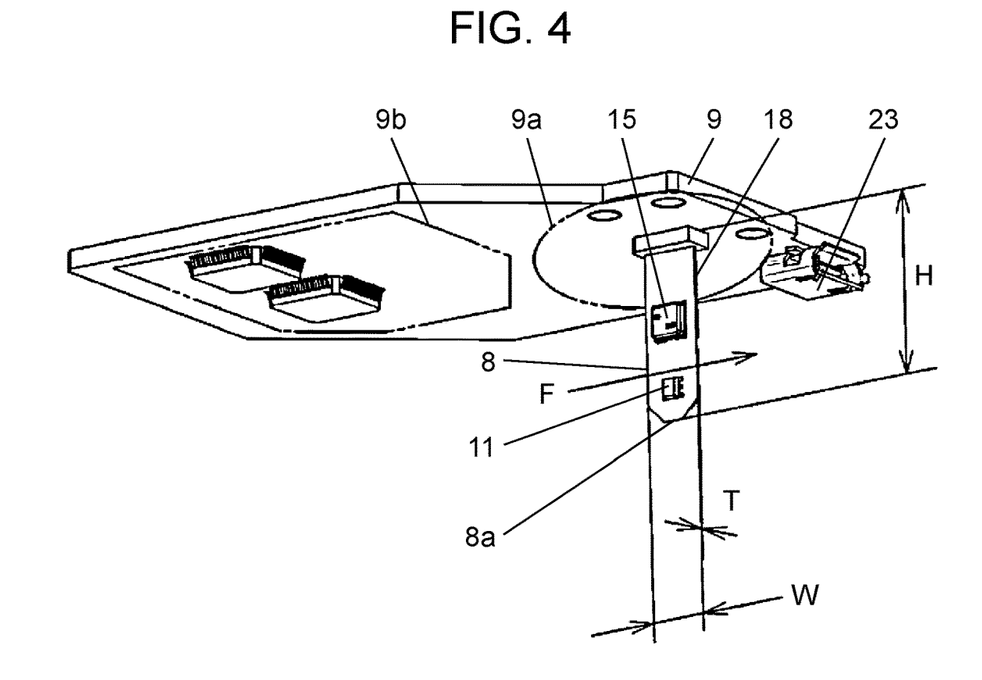
FIG. 4 is a perspective view of a substrate and the sensor plate of the ultrasonic flowmeter according to the first exemplary embodiment.

FIG. 1 is a transverse cross-sectional view of an ultrasonic flowmeter according to the first exemplary embodiment. FIG. 2 is a cross-sectional view taken along line 2-2 in FIG. 1. FIG. 3 is a view on arrow A of FIG. 2 illustrating a sensor plate of the ultrasonic flowmeter according to the first exemplary embodiment. FIG. 4 is a perspective view of a substrate and the sensor plate of the ultrasonic flowmeter according to the first exemplary embodiment.

As illustrated in FIGS. 1 to 4, a pair of ultrasonic transducers 3, 4 is disposed in flow path body 1 so as to face each other at a predetermined angle θ in the flow axis direction of flow path 2 through which a fluid to be measured (a gas such as air, methane, nitrogen, or hydrogen, or a liquid such as water or kerosene) flows. Ultrasonic transducers 3, 4 are housed in opening hole 5 opened in flow path 2 by vibration-proof sealing body 6 and fixed body 7 and are installed airtightly so that the fluid to be measured does not leak from opening hole 5.

Further, sensor hole 10 is formed on the downstream side of opening hole 5 in which ultrasonic transducer 4 is arranged in flow path 2, and flat sensor plate 8, which is mounted with temperature sensor 11 configured to measure the temperature of the fluid to be measured, projects from sensor hole 10 into flow path 2. Sensor plate 8 is fixed to substrate 9 so as to project from substrate 9 and is disposed so that sensor plate 8 is inserted into sensor hole 10 of flow path body 1 and temperature sensor 11 is positioned at a substantially central portion in the rectangular cross-section of flow path 2. Sealing body 12 such as an O-ring is interposed between flow path 2 and substrate 9, to which sensor plate 8 is fixed, for hermetical holding to prevent the fluid to be measured from leaking to the outside of flow path body 1.

Flow path 2 is connected to an external pipe (not illustrated) via inlet connection 13 and outlet connection 14 to allow the flow of the fluid to be measured.

Here, as illustrated in FIG. 4, sensor plate 8 is shaped like a thin strip having thickness T extremely smaller than width W and height H, and as illustrated in FIGS. 3 and 4, the direction of width W of sensor plate 8 is set to a direction along flow direction F in flow path 2 to make it difficult to receive the flow resistance of the flow of the fluid to be measured. The surface of sensor plate 8 provided with temperature sensor 11 is coated to enhance the corrosion resistance to the fluid to be measured.

Sensor plate 8 is not a rigid substrate with large hardness but is formed of a film-shaped flexible substrate and has flexible portion 18 that can be bent, so that thickness T can be made thinner to reduce the flow resistance of the fluid to be measured. In addition, even sensor plate 8 is erroneously brought into contact during production or maintenance, sensor plate 8 can be prevented from being broken by being bent and releasing the force.

Further, sensor plate 8 is provided with pressure sensor 15 for correcting a flow rate measurement value by fluid pressure, and as illustrated in FIG. 2, pressure sensor 15 is provided so as to be positioned in sensor hole 10 without being directly exposed to the main flow in flow path 2, thereby making it difficult to receive the flow resistance of the fluid to be measured.

As illustrated in FIGS. 1 and 2, in order to reliably hold sensor plate 8, groove-shaped guide 19 is provided on the wall surface of flow path 2 in sensor hole 10 (shown by partially broken in FIG. 2). Guide 19 fits and supports sensor plate 8 in sensor hole 10. Further, tip 8a of sensor plate 8 is inserted into and brought into contact with tip guide groove 20 formed by being recessed in the wall surface of flow path 2, and tip guide groove 20 holds tip 8a of the sensor plate 8. In this way, guide 19 supports sensor plate 8 in sensor hole 10, and tip guide groove 20 holds tip 8a of sensor plate 8, thereby preventing vibration of sensor plate 8 due to the flow of the fluid to be measured and preventing sensor plate 8 attached to connector 16 from falling off from substrate 9.

In the present exemplary embodiment, the case has been shown where the pressure is detected as a fluid characteristic value in addition to the temperature by disposing pressure sensor 15 on sensor plate 8. However, by mounting sensors for concentration, humidity, and the like and a detection sensor for a gas such as CO on sensor plate 8, it is possible to measure a characteristic corresponding to each of the sensors, and it is possible to enhance the measurement function of the fluid characteristic.

By forming sensor plate 8 with a flexible substrate, a wiring portion can be provided in the plastic film, and the surface coating treatment for imparting corrosion resistance can be made unnecessary to achieve cost reduction and simplification.

Further, as illustrated in FIG. 4, substrate 9 is configured such that sensor unit 9a having sensor plate 8 disposed thereon and controller 9b including a circuit for transmission and reception of ultrasonic waves and a flow rate measurement control circuit are integrated with each other, and sensor plate 8 and control unit 9b do not need to be connected by a lead wire. Substrate 9 is shielded by being covered with metal case 30 illustrated in FIG. 2.

Next, the operation of the ultrasonic flowmeter according to the present exemplary embodiment will be described.

One ultrasonic transducer 3 or 4 transmits ultrasonic waves to the fluid to be measured flowing through flow path 2, and the other ultrasonic transducer 4 or 3 receives the ultrasonic waves, thereby measuring the time required for propagation. Then, the flow velocity is measured from the time difference between the propagation time from the upstream side to the downstream side and the propagation time from the downstream side to the upstream side, and the flow rate is measured from the known cross-sectional area S, that is, the ultrasonic flow rate is measured by a so-called time difference method.

A microcomputer unit including a transmission and reception circuit for transmitting and receiving ultrasonic waves by using ultrasonic transducers 3, 4, an arithmetic circuit for calculating a flow rate from a propagation time, and an output circuit for outputting an arithmetic result is disposed in controller 9b, and controller 9b is connected to ultrasonic transducers 3, 4 by lead wire 22. Further, sensor unit 9a provided with sensor plate 8 and controller 9b having the microcomputer unit are integrated, and sensor unit 9a and controller 9b are connected by printed wiring in substrate 9 to eliminate wiring by lead wires of controller 9b and sensor unit 9a, thereby achieving simplification of the configuration, cost reduction, and improvement in ease of assembly. In addition, by the attachment to flow path body 1 with sealing body 12 interposed as illustrated in FIG. 2, the mounting of substrate 9 and the airtight sealing of sensor plate 8 can be performed at the same time, so that the ease of assembly can be enhanced.

Further, connection terminal 23 is provided on substrate 9, and a power supply, a measurement instruction, output of a measurement result, and the like are externally supplied to sensor unit 9a and controller 9b via connection terminal 23.

In measuring the flow rate of the fluid to be measured, it is very important to know the sound velocity of the ultrasonic wave so as to calculate the flow velocity from the propagation time. When the temperature of the fluid to be measured is a known value and is substantially constant, the temperature may be set as a predetermined constant value and the flow rate may be measured. However, since the sound velocity changes greatly depending on the temperature, when the ultrasonic flowmeter is used as a general-purpose flowmeter, it is effective to detect the fluid temperature and increase the measurement accuracy by using the sound velocity value at the fluid temperature. In the present exemplary embodiment, since temperature sensor 11 is provided on sensor plate 8 having a compact and simple configuration, it is possible to achieve a highly versatile and convenient ultrasonic flowmeter having a simple and compact configuration and further improved measurement accuracy.

Furthermore, by adding pressure sensor 15 to sensor plate 8, a compact sensor unit can be achieved to simplify components and reduce cost, and by using a flow state and a sound velocity in accordance with the pressure of the fluid to be measured for various fluids to be measured having different pressure conditions, measurement accuracy can be further enhanced, whereby a flowmeter with further enhanced measurement accuracy and improved versatility and convenience can be provided.

Since the sound velocity change due to the pressure change is not so large as compared with the magnitude of the sound velocity change due to the temperature change, the necessity of pressure detection is smaller than the necessity of temperature detection. However, by incorporating pressure sensor 15, the high measurement accuracy can be achieved for applications with different pressures, and the versatility can be further enhanced. In the present exemplary embodiment, pressure sensor 15 is housed and disposed in sensor hole 10 that hardly receives the flow resistance of the fluid to be measured, it is possible to select pressure sensor 15 with little consideration of the flow resistance, and it is possible to relax the restriction of the allowable range of the size of pressure sensor 15 and increase the degree of freedom in selecting a component.

In addition, since sensor plate 8 is provided with bendable, flexible portion 18 formed of a flexible substrate, even when sensor plate 8 is erroneously brought into contact before assembly at the time of manufacturing, component replacement, or the like, sensor plate 8 can be prevented from being broken due to unexpected contact by being bent and releasing the force at flexible portion 18 and can thus be easily handled, thereby enhancing the ease of assembly.

Tip 8a of sensor plate 8 is inserted into and come into contact with tip guide groove 20 provided on the wall surface of flow path 2, the vibration of sensor plate 8 due to the flow of the fluid to be measured is suppressed to prevent sensor plate 8 from being broken, and when connector 16 is provided and incorporated, sensor plate 8 can be prevented from coming off and falling off from connector 16.

Further, with sensor plate 8 being fitted to guide 19 provided on the wall surface of flow path 2, sensor plate 8 is pressed by guide 19 to prevent the vibration of sensor plate 8 due to the flow of the fluid to be measured, thereby preventing the breakage, and a thin flexible substrate can be used as sensor plate 8 to simplify the configuration and improve the reliability.

Second Exemplary Embodiment

Figure 5:
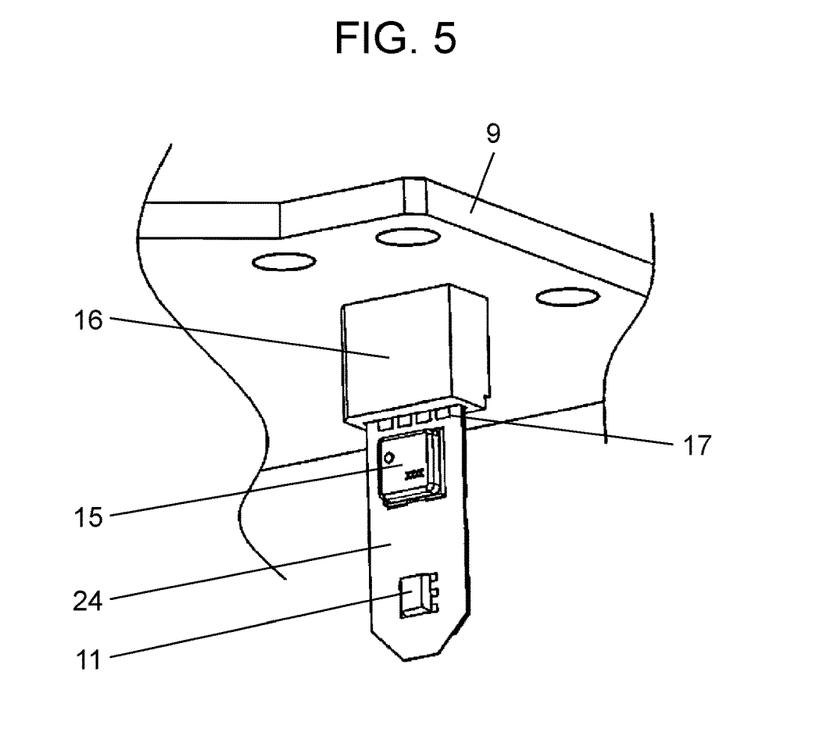
FIG. 5 is a partial perspective view illustrating a configuration of a sensor plate of an ultrasonic flowmeter according to a second exemplary embodiment.

FIG. 5 is a partial perspective view illustrating a configuration of a sensor plate of an ultrasonic flowmeter according to a second exemplary embodiment, and since the other configurations are the same as those of the first exemplary embodiment, the description thereof is omitted.

As illustrated in FIG. 5, connector 16 is fixedly disposed on substrate 9, sensor plate 24 having electrical contact 17 is inserted into connector 16, and sensor plate 24 is detachably attached to substrate 9 so as to perform signal transmission of a temperature detection signal and a pressure detection signal via electrical contact 17.

Figure 6:
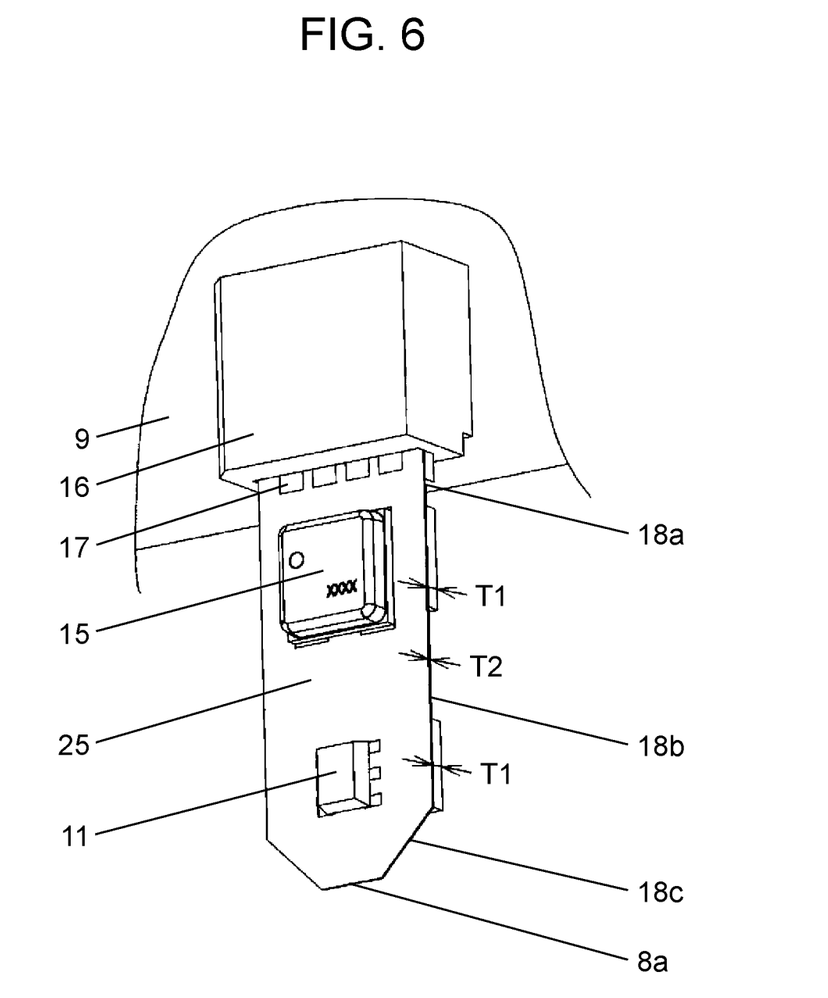
FIG. 6 is a partial perspective view illustrating another configuration of the sensor plate of the ultrasonic flowmeter according to the second exemplary embodiment.

FIG. 6 is a perspective view illustrating another configuration of sensor plate 24 illustrated in FIG. 5, and as illustrated in the figure, sensor plate 25 is formed of a film-shaped flexible substrate, thickness T1 of the portion where the sensor is disposed is increased, thickness T2 of the other portion is kept thin (T1>T2), and the sensor plate has flexible portions 18a, 18b, 18c which can be bent at thickness T2, so that the strength of sensor plate 25 is improved while breakage is prevented.

According to sensor plates 24, 25 of the present exemplary embodiment, connector 16 is provided on substrate 9 to detachably attach sensor plates 24, 25, and signal transmission is performed with substrate 9 side via electrical contact 17 to make the sensor plates 24, 25 detachable, so that it is possible to select and recombine components suitable for a difference in measurement purpose and a difference in the fluid to be measured.

Hence the producer side of the flowmeter can improve productivity such as component sharing with respect to expansion of product types, and the user side of the flowmeter can improve the application expansion and the maintainability by the sensor plate replacement with less investment. Therefore, it is possible to achieve an ultrasonic flowmeter with enhanced versatility and good productivity and maintainability.

With electrical contact 17 being present in connector 16, there is a restriction that the ultrasonic flowmeter cannot be used for a conductive liquid such as water as the fluid to be measured, but improvement in productivity and versatility and improvement in maintainability are more effective.

Third Exemplary Embodiment

Figure 7:
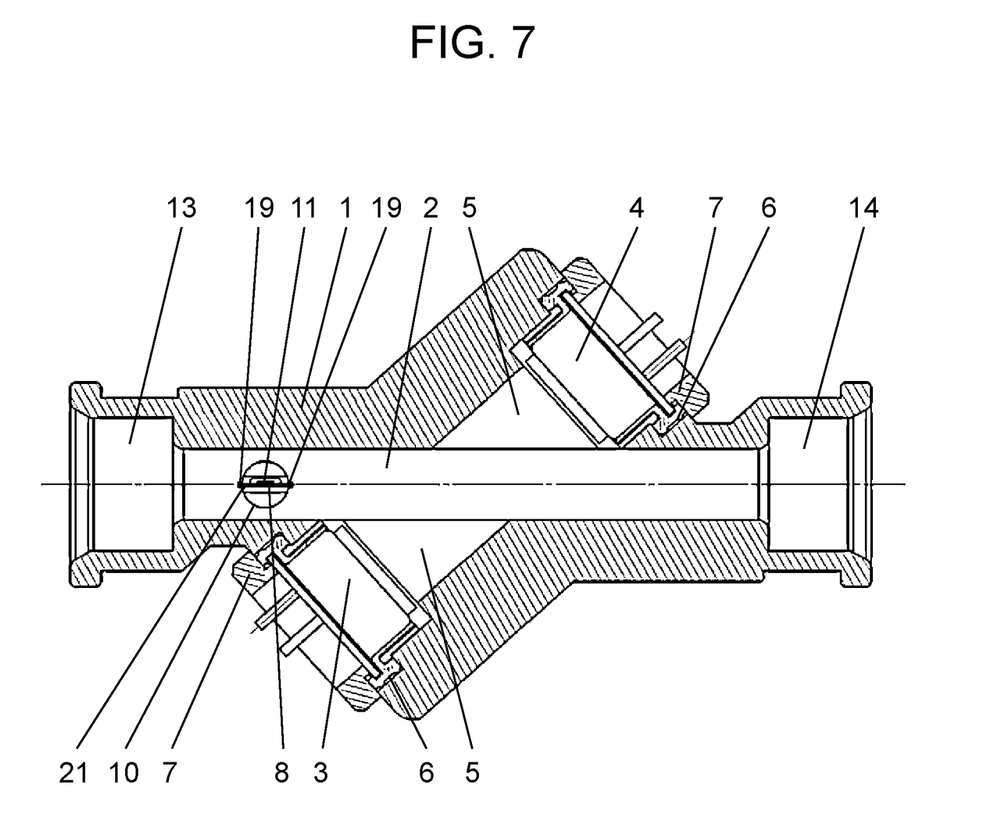
FIG. 7 is a transverse cross-sectional view of an ultrasonic flowmeter according to a third exemplary embodiment.

FIG. 7 is a transverse cross-sectional view of an ultrasonic flowmeter according to a third exemplary embodiment. In the ultrasonic flowmeter according to the third exemplary embodiment, sensor plate 8 is disposed on the upstream side of opening hole 5 in flow path 2 where the ultrasonic transducer 3 is disposed, and since the other configurations are the same as those in the first exemplary embodiment, the description thereof is omitted.

In the present exemplary embodiment, sensor plate 8 is disposed, on the upstream side of flow path 2, as rectifier 21 that adjusts the flow state of the fluid to be measured, thereby enabling more stable flow rate measurement with reduced turbulence in the flow of the fluid to be measured. Thinner sensor plate 8 can prevent an increase in flow resistance.

Fourth Exemplary Embodiment

Figure 8A:
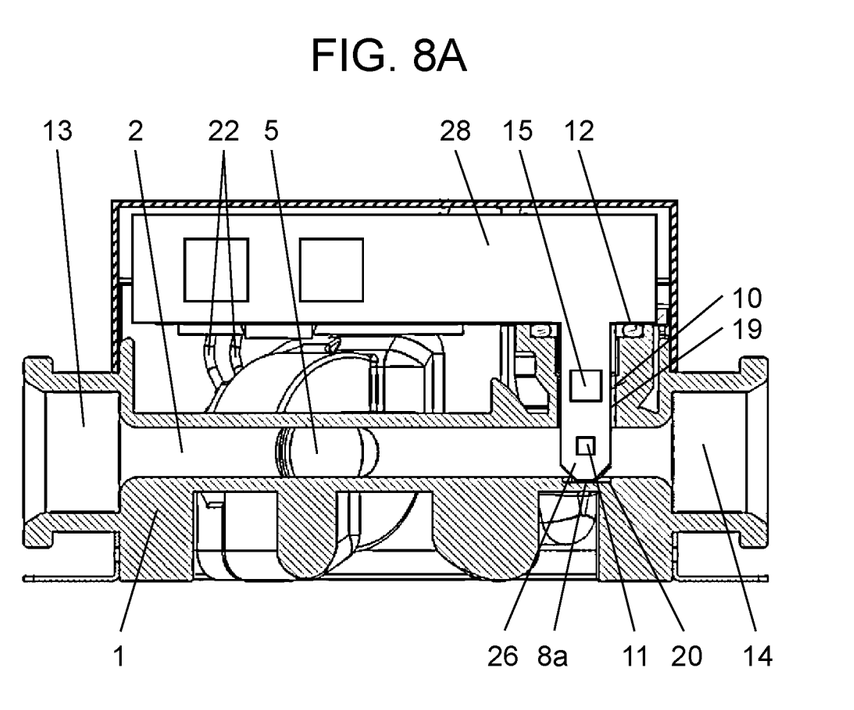
FIG. 8A is a longitudinal sectional view of an ultrasonic flowmeter according to a fourth exemplary embodiment.

FIG. 8A is a longitudinal sectional view of an ultrasonic flowmeter according to a fourth exemplary embodiment.

Figure 8B:
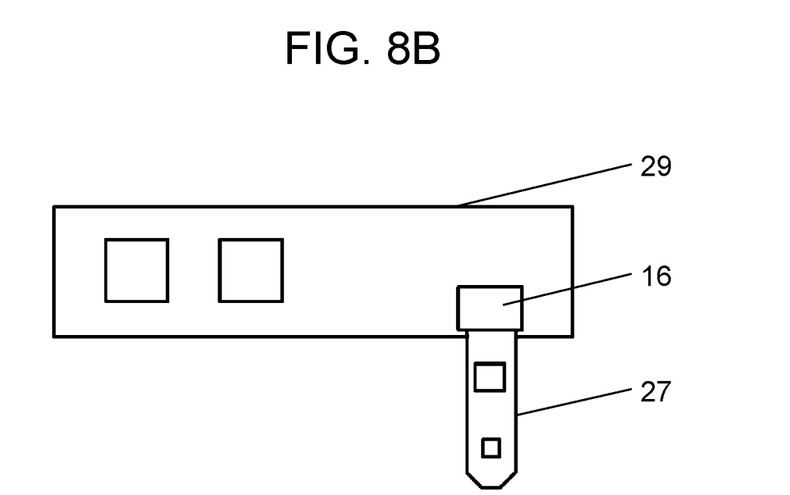
FIG. 8B is a view illustrating another configuration of the sensor plate of the ultrasonic flowmeter according to the fourth exemplary embodiment.

FIG. 8B is a view illustrating another configuration of the sensor plate of the ultrasonic flowmeter according to the fourth exemplary embodiment. As illustrated in FIG. 8A, by forming sensor plate 26 integrally with substrate 28 so that a part of substrate 28 projects on a plane, temperature sensor 11 and pressure sensor 15 of sensor plate 26 can be simultaneously arranged when circuit components constituting a controller on the substrate 28 are disposed, and hence a reduction in man-hours can be achieved. In a case where sensor plate 27 is configured to project parallel to the plane of substrate 29 by using connector 16 as illustrated in FIG. 8B, the same effect as that of the second exemplary embodiment of substrate 29 can be obtained.

As described above, in the present exemplary embodiment, the placement of the pair of ultrasonic transducers has been described as a configuration in which the propagation path of the ultrasonic wave is formed in a so-called Z shape so as to cross the flow only once. However, the present invention is not limited to this, but the pair of ultrasonic transducers may be disposed on the same side of the measurement flow path, and the ultrasonic propagation path may have a V-shape or an I-shape parallel to the flow.

Although the example in which the measurement flow path has a rectangular cross-section has been shown here, it is needless to say that the same applies to other circular cross sections.

As described above, the first disclosure includes: a flow path body having a flow path through which a fluid to be measured flows; a pair of ultrasonic transducers disposed in the flow path body; a substrate fixed to the flow path body; a sensor plate on which a temperature sensor for detecting the temperature of the fluid to be measured is disposed, the sensor plate being flat; and an arithmetic unit that calculates the flow rate of the fluid to be measured from the propagation time of ultrasonic waves between the pair of ultrasonic transducers and the temperature detected by the temperature sensor. The sensor plate is configured to project from the substrate and to project into the flow path cross-section of the flow path from the sensor hole provided in the flow path body at the time of fixing the substrate to the flow path body.

With this configuration, it is possible to achieve an ultrasonic flowmeter that can significantly reduce the influence of the ambient temperature of the flow path to measure the fluid temperature with high accuracy and has high measurement accuracy.

In a second disclosure, particularly in the first disclosure, the sensor plate may be fixed to project perpendicularly from the substrate, and a sealing body may be provided between the substrate and the flow path body to prevent leakage of the fluid to be measured from the sensor hole. With this configuration, the wiring of the sensor and the airtight configuration can be achieved with a simple configuration.

In a third disclosure, particularly in one of the first and second disclosures, a connector may be disposed on the substrate, and the sensor plate may be detachably attached via the connector.

With this configuration, it is possible to select a component suitable for a difference in measurement purpose and a difference in fluid to be measured, so that the versatility of the ultrasonic flowmeter can be enhanced, and an ultrasonic flowmeter with good maintainability for sensor replacement can be realized.

In a fourth disclosure, particularly in any one of the first to third disclosures, the sensor plate may be provided with a bendable flexible portion formed of a flexible substrate. With this configuration, it is possible to prevent the sensor plate from being broken due to unexpected contact at the time of manufacturing or component replacement and to improve the ease of assembly.

In a fifth disclosure, particularly in any one of the first to fourth disclosures, the tip of the sensor plate may be in contact with a wall surface of the flow path. With this configuration, the vibration of the sensor plate due to the flow of the fluid to be measured is suppressed to prevent breakage, and when the connector is provided, the sensor plate can be prevented from falling off from the connector.

In a sixth disclosure, particularly in any one of the first to fifth disclosures, the sensor plate may be fitted to a guide provided on the inner wall surface of the sensor hole. With this configuration, the vibration of the sensor plate due to the flow of the fluid to be measured is suppressed to prevent the breakage, and a thin flexible substrate can be used as the sensor plate to simplify the configuration and improve the reliability.

In a seventh disclosure, particularly in any one of the first to sixth disclosures, the sensor plate may be a rectifier that is disposed on the upstream side of the flow path to regulate the flow of the fluid to be measured. With this configuration, the flow disturbance can be reduced to perform stable flow rate measurement, and the increase in flow resistance can be prevented by the thin sensor plate.

In an eighth disclosure, particularly in any one of the first to seventh disclosures, the sensor plate may include a pressure sensor for detecting a pressure that is a fluid characteristic of the fluid to be measured. With this configuration, a compact sensor unit can be achieved to simplify components and reduce cost, and an ultrasonic flowmeter with higher versatility and higher measurement accuracy can be realized.

In a ninth disclosure, particularly in any one of the first to eighth disclosures, the arithmetic unit may be formed on the substrate. With this configuration, it is possible to realize a compact ultrasonic flowmeter with good ease of assembly at a low cost.

INDUSTRIAL APPLICABILITY

As described above, the ultrasonic flowmeter of the present disclosure can measure the fluid temperature with high accuracy, can achieve a flowmeter with high measurement accuracy, can easily configure the wiring and airtight configuration of the sensor, and can achieve a highly versatile ultrasonic flowmeter with high ease of assembly and maintainability.

By adopting this method, even when the fluid to be measured is changed or even when the measurement purpose is different, it is possible to cope with the change only by replacing the sensor plate, and it is possible to construct a system of an ultrasonic flowmeter having a wide application range and high versatility.

REFERENCE MARKS IN THE DRAWINGS 1 flow path body
2 flow path
3, 4 ultrasonic transducer
8, 24, 25, 26, 27 sensor plate
8a tip
9, 28, 29 substrate
9a sensor unit
9b controller (arithmetic unit)
10 sensor hole
11 temperature sensor
12 sealing body 15 pressure sensor
16 connector
18, 18a, 18b, 18c flexible portion
19 guide
21 rectifier

The invention claimed is:

1. An ultrasonic flowmeter comprising:
a flow path body having a flow path where a fluid to be measured flows;
a pair of ultrasonic transducers disposed in the flow path body;
a substrate fixed to the flow path body;
a sensor plate where a temperature sensor for detecting a temperature of the fluid to be measured is disposed, the sensor plate being flat; and
an arithmetic unit that calculates a flow rate of the fluid to be measured from a propagation time of ultrasonic waves between the pair of ultrasonic transducers and the temperature detected by the temperature sensor, wherein
the flow path body has a sensor hole formed therein,
the flat sensor plate is inserted into the sensor hole so as to project into a flow path cross-section of the flow path, and
the temperature sensor is positioned at a substantially central portion in a rectangular cross-section of the flow path.

2. The ultrasonic flowmeter according to claim 1, wherein
the flat sensor plate is fixed to project perpendicularly from the substrate, and
a sealing body is provided between the substrate and the flow path body to prevent leakage of the fluid to be measured from the sensor hole.

3. The ultrasonic flowmeter according to claim 1, wherein
the substrate has a connector, and
the flat sensor plate is detachably attached to the substrate via the connector.

4. The ultrasonic flowmeter according to claim 1, wherein the flat sensor plate has a bendable flexible portion formed of a flexible substrate.

5. The ultrasonic flowmeter according to claim 1, wherein a distal end of the flat sensor plate away from the substrate has a tip in contact with a wall surface of the flow path body.

6. The ultrasonic flowmeter according to claim 1, wherein the flat sensor plate is fitted to a guide provided on an inner wall surface of the sensor hole.

7. The ultrasonic flowmeter according to claim 1, wherein the flat sensor plate is a rectifier that is disposed on an upstream side of the flow path to regulate a flow of the fluid to be measured.

8. The ultrasonic flowmeter according to claim 1, wherein the flat sensor plate includes a pressure sensor for detecting a pressure that is a fluid characteristic of the fluid to be measured.

9. The ultrasonic flowmeter according to claim 1, wherein the arithmetic unit is disposed on the substrate.

* * * * *